United States Patent [19]

Ooms

[11] Patent Number: 5,467,698
[45] Date of Patent: Nov. 21, 1995

[54] AUTOMATIC DEVICE FOR PRODUCING A COOLED SEMI-LIQUID FOOD PRODUCT AND CLEANING DEVICE USED THEREBY

[76] Inventor: Guido Ooms, Beringenbaan 110, 3295 Diest, Belgium

[21] Appl. No.: 307,756
[22] PCT Filed: Mar. 23, 1993
[86] PCT No.: PCT/BE93/00015
  § 371 Date: Sep. 27, 1994
  § 102(e) Date: Sep. 27, 1994
[87] PCT Pub. No.: WO93/19616
  PCT Pub. Date: Oct. 14, 1993

[30] Foreign Application Priority Data

Mar. 27, 1992 [BE] Belgium ............................... 09200296

[51] Int. Cl.⁶ ........................... A23G 9/30; A23C 7/02
[52] U.S. Cl. ............................... 99/455; 62/303; 62/342; 99/517; 366/138; 366/149
[58] Field of Search ............................ 99/452–455, 516, 99/517; 366/144, 138, 147, 149; 62/63, 136, 342, 302, 343

[56] References Cited

U.S. PATENT DOCUMENTS

| | | | |
|---|---|---|---|
| 2,977,097 | 3/1961 | Cohrt | 366/324 |
| 3,273,585 | 9/1966 | Patch | 62/303 |
| 3,638,448 | 2/1972 | Raymer | 62/303 |
| 3,989,492 | 11/1976 | Keyes | 62/342 |
| 3,995,770 | 12/1976 | Schwitters | 222/145 |
| 4,275,567 | 6/1981 | Schwitters | 62/68 |
| 4,606,200 | 8/1986 | Nielsen | 366/149 |
| 4,758,097 | 7/1988 | Iles, Sr. | 99/455 |

*Primary Examiner*—Timothy F. Simone
*Attorney, Agent, or Firm*—Bacon & Thomas

[57] ABSTRACT

An automatic device for producing a cooled semi-liquid food product includes a pump, a suction conduit connected to the pump and provided with a connection piece which is connected during operation to a reservoir, a pressure conduit connected to the pump which defines a draught end, and a cooling element. The cooling element includes a cooled part which is located in the pressure conduit. The device further incorporates a cleaning device having a cleaning conduit which is provided with a connection piece that fits on a closeable opening of the pressure conduit and with a connection piece removably attached to the connection piece of the suction conduit, a closeable drain conduit connected to the cleaning conduit, a closeable supply conduit for liquid under pressure for cleaning or rinsing that is connected to the cleaning conduit, an arrangement for blocking the drain conduit and an assembly for blocking the liquid supply conduit.

12 Claims, 5 Drawing Sheets

AUTOMATIC DEVICE FOR PRODUCING A COOLED SEMI-LIQUID FOOD PRODUCT AND CLEANING DEVICE USED THEREBY

BACKGROUND OF THE INVENTION

1. Field of the Invention

The invention relates to an automatic device for producing a cooled semi-liquid food product, more specifically soft-ice, milk-shake or yoghurt, starting from a composition, which automatic device comprises a pump, a suction conduit connected at one end to the pump and, during operation, to a reservoir with the composition, a pressure conduit connected at one end to the pump and the other end of which forms a draught end for the food product, a cooling element, of which the cooling part forms the evaporator of a cooling circuit and the cooled part is located in said pressure conduit and a cleaning device comprising, in turn, a cleaning conduit, one end of which fits on a closable opening of the pressure conduit at or in the vicinity of the draught end, a closeable drain conduit connecting to this cleaning conduit, means for blocking the drain conduit and a liquid supply means.

2. Discussion of the Prior Art

Automatic devices are known for producing soft-ice or milk-shakes. A liquid composition is pumped from a reservoir, usually a supple bag, by means of the pump which also provides for an injection of air and thus the whipping of the mixture. The thus whipped mixture is consequently cooled in the cooling element. A rotating screw-shaped scraping is mounted around the cooling part of this element, scraping the whipped mixture over the cooling part and pushing it towards the draught end. Soft-ice is cooled in such a way that ice formation occurs around the cooling part.

Such automatic devices are also used for distributing yoghurt. With these automatic devices, the whipping with air is not necessary, and the pump does not inject air but is only used for pumping the yoghurt composition from the reservoir to the cooling element.

It is generally known that the bacteriological cleanness of the food products produced by the above-mentioned automatic devices sometimes leaves much to be desired. This is caused by a lack of regular and effective cleaning of the parts coming in contact with the food product or the composition. In order to clean the known automatic device, the suction conduit has to be disconnected from the reservoir and has to be put consecutively in one of more reservoirs with liquids such as a cleaning liquid, a so called sanitary liquid and a rinsing liquid.

A device of this kind is disclosed in U.S. Pat. No. 2,977,097. In this device, the suction conduit is inserted in the reservoir with the composition during operation. For cleaning, this suction conduit is directly connected to a water reservoir, which can be time consuming as the suction conduit is not provided with a connecting piece. For cleaning, a cleaning conduit is connected with one end to the draught or dispensing end of the pressure conduit and with the other end to the air-inlet pipe of the pump. During cleaning, water is circulated by means of the pump with a limited flow rate and only through the pressure conduit and the air-inlet pipe, and not through the suction conduit. Cleaning is consequently not effective. Moreover, if other liquids for cleaning have to be used, such as a detergent, the cleaning conduit has to be disconnected.

U.S. Pat. No. 3,273,585 discloses a flushing apparatus for dispensing freezers. The dispensing freezers are however of the type without a pump wherein the mix or food product is delivered by gravity. Such freezers comprise an open mix storage tank on top and thereunder the freezing cylinder. Cleaning may take place when the mix storage tank is empty by introducing water through a spout mounted above the storage tank. Circulation of the water is not possible. Therefore cleaning is not effective.

SUMMARY OF THE INVENTION

The invention aims at avoiding these disadvantages and at providing an automatic device for producing a cooled semi-liquid food product, which can be cleaned in a simple, rapid and effective way.

To this end, the suction conduit is provided at its end which is connected during operation to the reservoir with a product, with a connecting piece fitting on the reservoir, while the cleaning conduit is provided at its other end with a connection piece fitting removably to the first mentioned connection piece, the liquid supply means comprising a closeable supply conduit for liquid under pressure for cleaning or rinsing being connected to this cleaning conduit and means for blocking the liquid supply conduit, and in that the cleaning device is provided in its cleaning conduit with an additional pump having a higher delivery than the delivery of the pump mounted between the suction conduit and the pressure conduit and with a shunt of the latter pump.

Depending on whether or not the means for closing the drain and the means for closing the supply conduit are in operation, liquid can be added to, drained from or circulated in a closed circuit through the parts of the automatic device to be cleaned, which are in contact with the food product of the composition. Easy and effective cleaning is possible. Due to the additional pump liquid can be drained or circulated at a high delivery. The liquid which cannot be pumped by the pump between the suction conduit and the pressure conduit can flow through the shunt.

The shunt is effectively closeable. This can be realized by connecting the shunt to the pressure conduit or to the suction conduit by means of a three-way tap.

In a particular embodiment of the invention, the means for closing the drain comprise a three-way tap which is mounted not only in the drain but also in the cleaning conduit.

In an other particular embodiment of the invention, the supply conduit is connected to the cleaning conduit by means of a three-way tap.

The above-mentioned additional pump is preferably mounted between the first connection piece of the cleaning conduit and the drain.

In a preferred embodiment of the invention, the supply conduit is provided with means for connecting it to the water distribution network and the means for closing the supply conduit contains at least one valve.

The cleaning device preferably comprises thereby a reservoir for special liquid, mounted in a conduit part which is parallel to a part of the supply conduit, whereas the means for closing the supply conduit comprise two valves, one in the part of the supply conduit and one in the parallel conduit part.

The supply conduit can even comprise two connections, one for hot water and one for cold water, and two reservoirs for special liquid mounted in conduit parts respectively parallel to the conduit parts with the two connections, whereas the means for closing the supply conduit comprise four valves, one on the conduit part with the connection for cold water, one on the parallel conduit part therefor, one on the conduit part with the connection for hot water and one on the parallel conduit part therefor.

The invention also relates to the cleaning device from the automatic device according to one of the preceding embodiments.

This cleaning device can be commercialized as such to be mounted on existing automatic devices without such a device.

BRIEF DESCRIPTION OF THE DRAWINGS

In order to better show the characteristics of the invention, a preferred embodiment of a automatic device for producing a cooled semi-liquid food product and of a cleaning device according to the invention used thereby, is described as an example without any limitative character whatsoever, reference being made to the accompanying drawings, in which.

DETAILED DESCRIPTION OF THE PREFERRED EMBODIMENT

Figure 1:
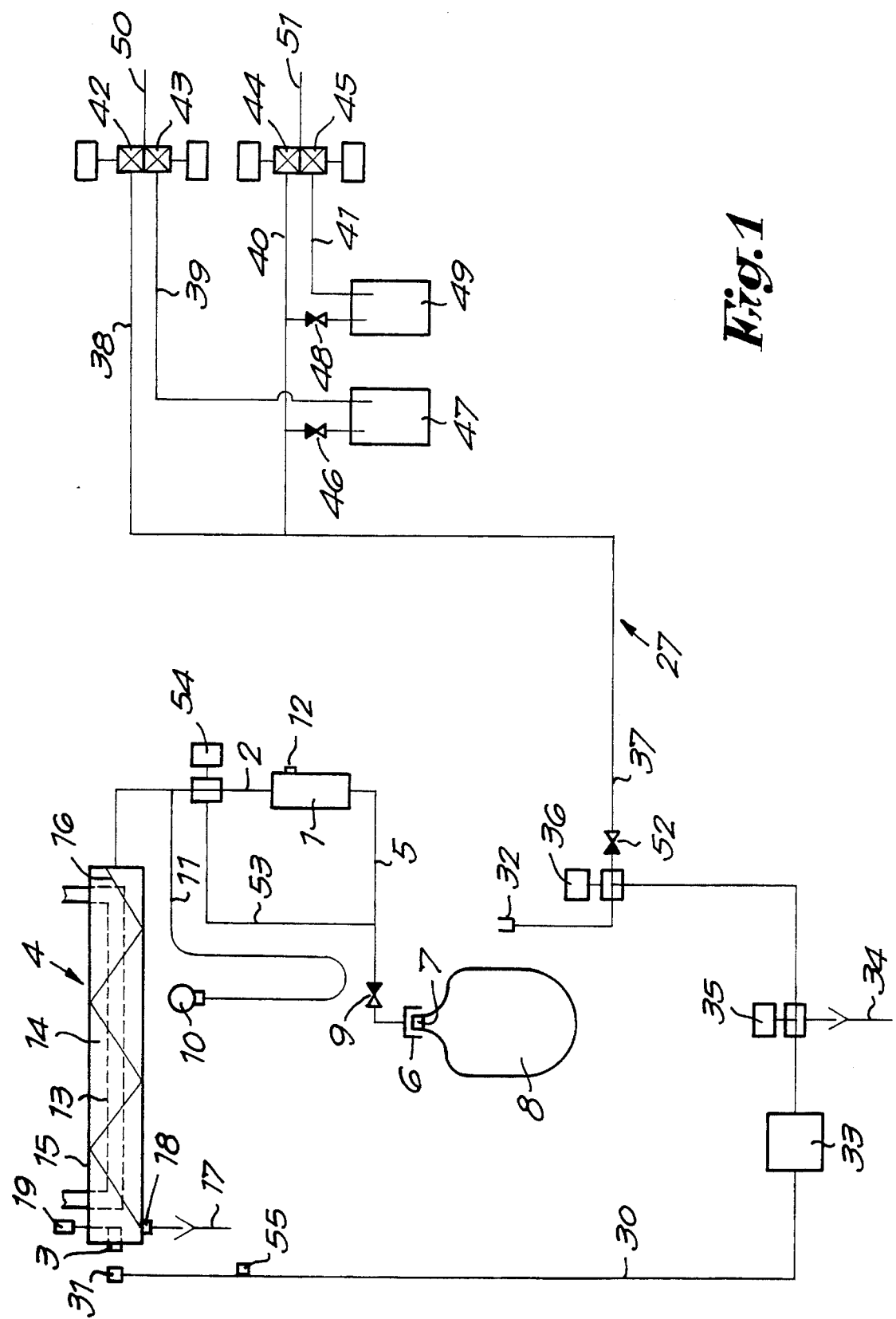
FIG. 1 is a schematic representation of a soft-ice automatic device according to the invention, during its normal operation.

The soft-ice automatic device represented in FIGS. 1 to 4 comprises in the usual way a blending pump 1, a pressure conduit 2 connecting the pressure side of the blending pump 1 to the draught end 3, a cooling element 4 mounted in the pressure conduit 2 and a suction conduit 5 connecting the suction side of the blending pump 1 to a connection piece 6 which is connected, during the normal operation, to a corresponding connection piece 7 of a bag 8 with a liquid composition.

In the suction conduit 5 a recoil valve 9 is mounted and a pressure meter 10 is connected to the pressure conduit through a conduit 11.

The blending pump 1 is a cylinder pump which not only pumps up liquid composition from the bag 6 but also injects air in this composition through a suction opening 12, and whips this composition with air.

The cooling element 4 comprises an inner cooling part 13 and around it a circular cooled chamber 14, confined at the outside by the casing 15 and forming part of the pressure conduit 2. In this chamber 14 a scraper 16, this is a frame with helical scraping knives, is mounted rotatably around the part 13 to scrape off the crystals of the composition formed on this part. The chamber 14 connects at the one hand to the draught end 3 of the pressure conduit, protruding outside the casing 15 and at the other hand to a closeable disairing opening 18 which leads to a drain 17. A manually operated draught valve 19 is mounted on the draught end, thus forming together with the draught end a closeable opening of the pressure conduit 2.

Figure 5:
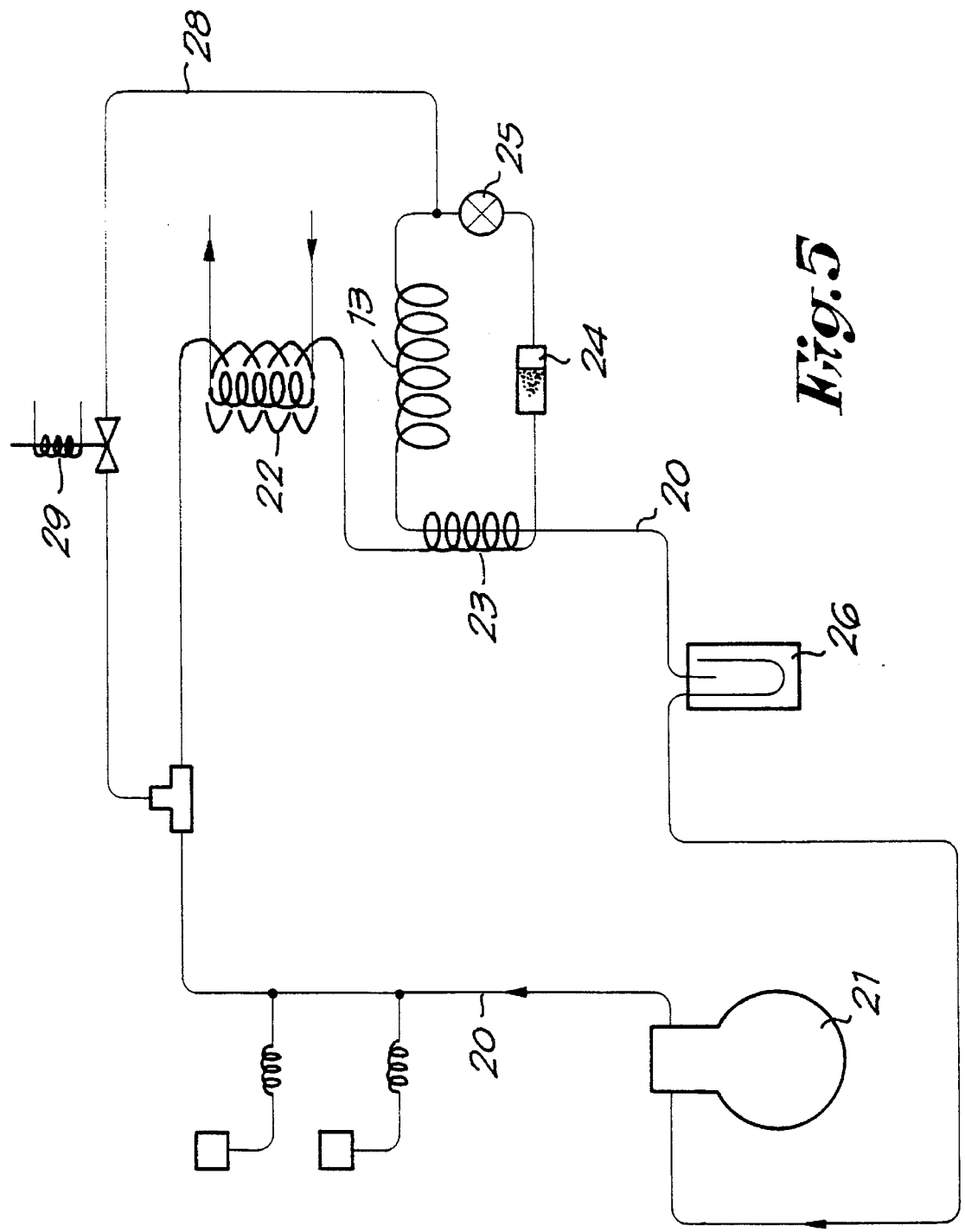
FIG. 5 is a schematic representation of the cooling circuit of the automatic device of the preceding figures.

The cooling part 13 forms the evaporator of the cooling circuit represented in more detail in FIG. 5. This cooling circuit comprises a conduit 20 forming a closed circuit, in which subsequently in the flow direction the compressor 21, the water and air-cooled condenser 22, the primary part of the heat exchanger 23, the filter 24, the expansion valve 25, said evaporator 13, the secondary part of the heat exchanger 23 and the moisture excreter 26 are mounted.

A main characteristic for the invention is the fact that the automatic device comprises a cleaning device 27 and a shunt conduit 28, bridging over the condenser 22, the heat exchanger 23, the filter 24 and the expansion valve 25 of the cooling circuit together, and in which an electromagnetic valve is mounted.

The cleaning device 27 comprises a cleaning conduit 30 ending, at the one hand in a connection piece 31 and, at the other hand, in a connection piece 32.

In this cleaning conduit 30 a centrifugal pump 33 is mounted, the delivery of which is higher than that of the blending pump 1.

A drain conduit 34 is connected to the cleaning conduit 30 by means of a pneumatic three-way valve 35 which never closes the cleaning conduit, but in one position blocks the drain conduit 34 and in the other position connects this drain conduit to the cleaning conduit 30.

Between the three-way valve 35 and the connection piece 32, a second three-way valve 36 is mounted in the cleaning conduit.

A supply conduit 37 is also connected to the cleaning conduit 30, which supply conduit connects, on the one hand, to the three-way valve 36 and, at the other hand, through branchings 38, 39, 40 and 41 to four electromagnetic valves 42, 43, 44 and 45.

The three-way valve 36 is mounted in such a way that it never blocks the connection of the supply conduit 37 to the cleaning conduit 30, but in one position blocks the cleaning conduit 30 and in the other position connects the parts of this cleaning conduit 30 at both sides of the three-way valve 36.

In the branching 39, a recoil valve 46 and a first reservoir 47 are mounted, whereas in the branching 41 another recoil valve 48 and a second reservoir 49 are mounted.

The valves 42 and 43 are connected through a connection 50 to a hot water boiler which is connected to the water supply network, whereas the valves 44 and 45 are connected through a connection 51 to the water supply network.

A recoil valve 52 is mounted in the supply conduit 36.

The blending pump 1 is bridged by a shunt conduit 53. Between the blending pump 1 and the cooling element 4, this shunt conduit 53 connects to the pressure conduit 2 by means of a pneumatic three-way valve 54. This three-way valve 54 can never block the pressure conduit 2, but on one position blocks the shunt conduit 53 and in the other position connects the shunt conduit 53 to the pressure conduit 2.

The first conduit part 30 is provided with a closeable connection 55, to which the conduit 11 can be connected, which conduit 11 can be disconnected from the pressure meter 10.

The operation of the automatic device is as follows:

During normal operation it is in the condition represented in FIG. 1. The connection pieces 6 and 7 are connected to each other and the suction conduit 5 is connected to the bag 8. The shunt conduit 53 is blocked by the three-way valve 54. The conduit 11 connects to the pressure meter 10. The disairing opening 18 is closed and the connection piece 31 is disconnected from draught end 3. The valve 29 in the cooling circuit is closed.

When soft-ice is made, the blending pump 1 is in operation and the draught valve 19 is open. Liquid composition is pumped from the bag 8, whipped in the blending pump 1 and tranformed to ice in the cooling element 4, which ice is drawn through the draught end 3 which can be closed by the draught valve 19.

To clean the automatic device, the connection piece 6 is disconnected, and connected to the connection piece 32. The disairing opening 18 is opened, as well as the draught valve 19, and the connection piece 31 is connected to the draught end 3. The conduit 11 is also connected to the connection 55. The reservoirs 47 and 49 are filled respectively with so-called sanitary liquid and cleaning product.

By means of an electronic control mechanism, which is not represented in the figures for the sake of simplicity, the pneumatic three-way valves 32, 35 and 54 and the valves 29, 42, 43, 44 and 45 are controlled.

Thus, the following operations can be executed:

One can rinse, meaning that through the supply conduit 37 liquid is supplied to the cleaning conduit 30 and drained off through the drain conduit 34. The different three-way valves and their valves are in the position represented in FIG. 2. The three-way valve 54 connects the shunt conduit 53 to the pressure conduit 2 and the three-way valve 35 connects the drain conduit 34 with the cleaning conduit 30. The centrifugal pump 33 is in operation. This liquid flows over the three-way valve 36, the connection pieces 6 and 32, the suction conduit 5, the blending pump 1, the pressure conduit 2 with the draught end 3 which is kept open by the draught-valve 19, the conduit 30, the pump 33 and the three-way valve 35 to the drain conduit 34. Some of the liquid also flows through the open disairing opening 18 from the pressure conduit 2 straight in the drain 17.

Figure 2:
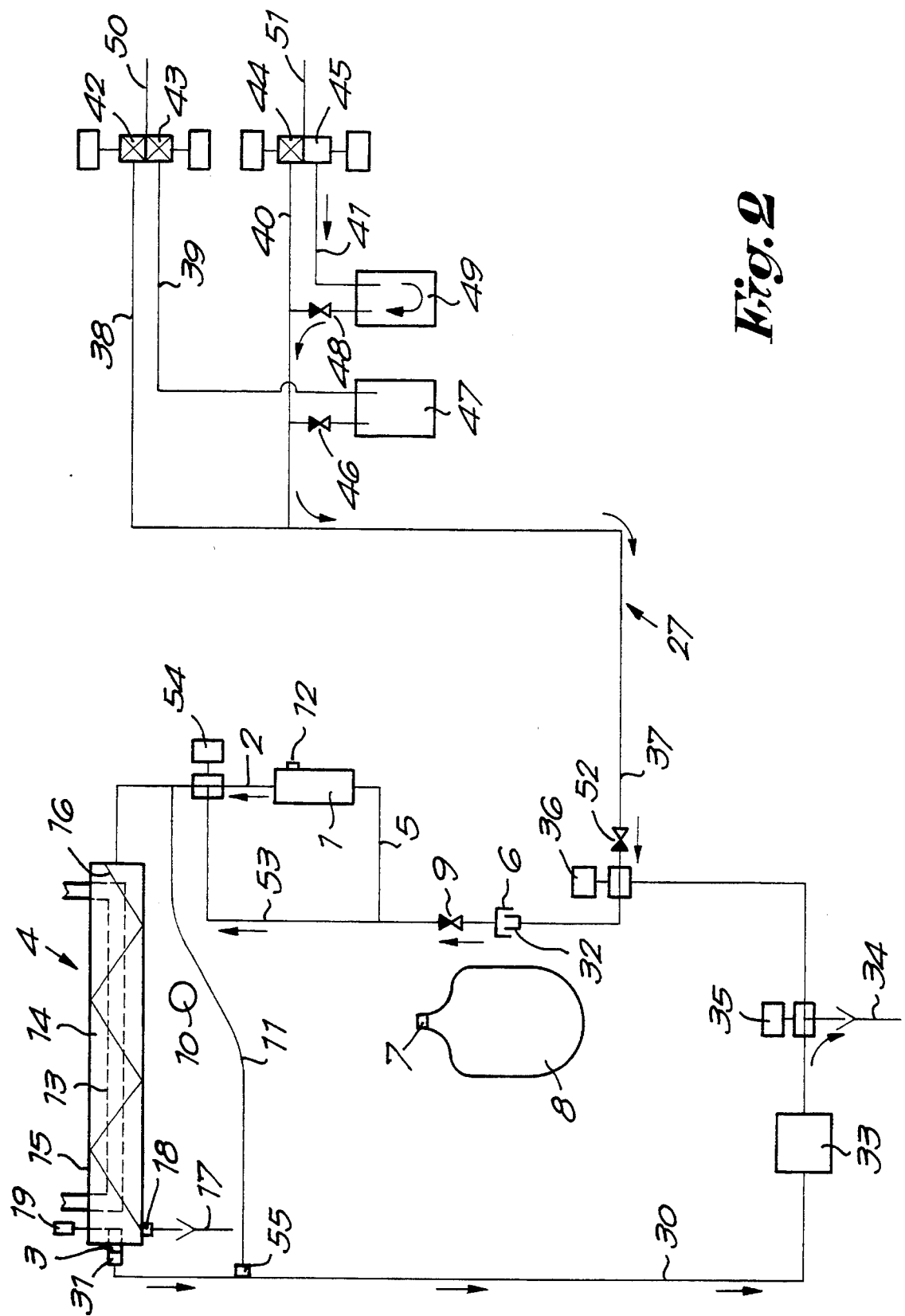
FIG. 2 is a schematic representation of the automatic device of the preceding figure, but during the adding of cleaning, disinfecting or rinsing liquid.

One of the valves 42, 43, 44 and 45 is open. Depending on the choice of valve the rinsing is executed with hot water (valve 42 open), with hot water mixed with sanitary liquid (valve 43 open), with pure cold water (valve 44 open) or with cold water mixed with cleaning liquid (valve 45 open). In FIG. 2, the rinsing with cold water mixed with cleaning liquid is indicated by means of arrows.

Figure 3:
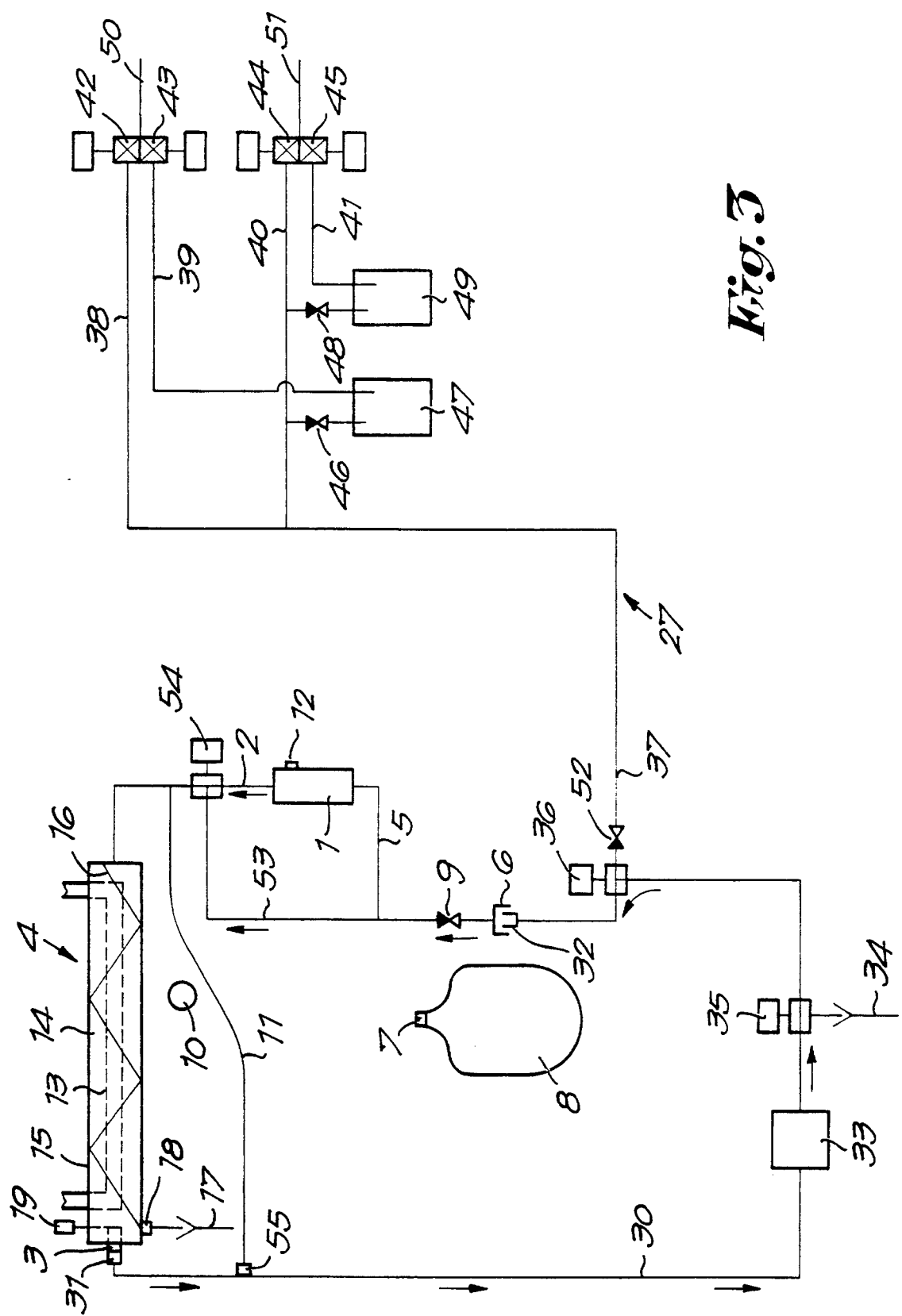
FIG. 3 is a schematic representation of the automatic device of the preceding figures, but during the circulation of cleaning, disinfecting or rinsing liquid.

The liquid brought in the cleaning conduit 30 as with the rinsing, can also be pumped around in a closed circuit through this conduit 30, the pressure conduit 2 and the suction conduit 5, as is represented in FIG. 3.

Figure 4:
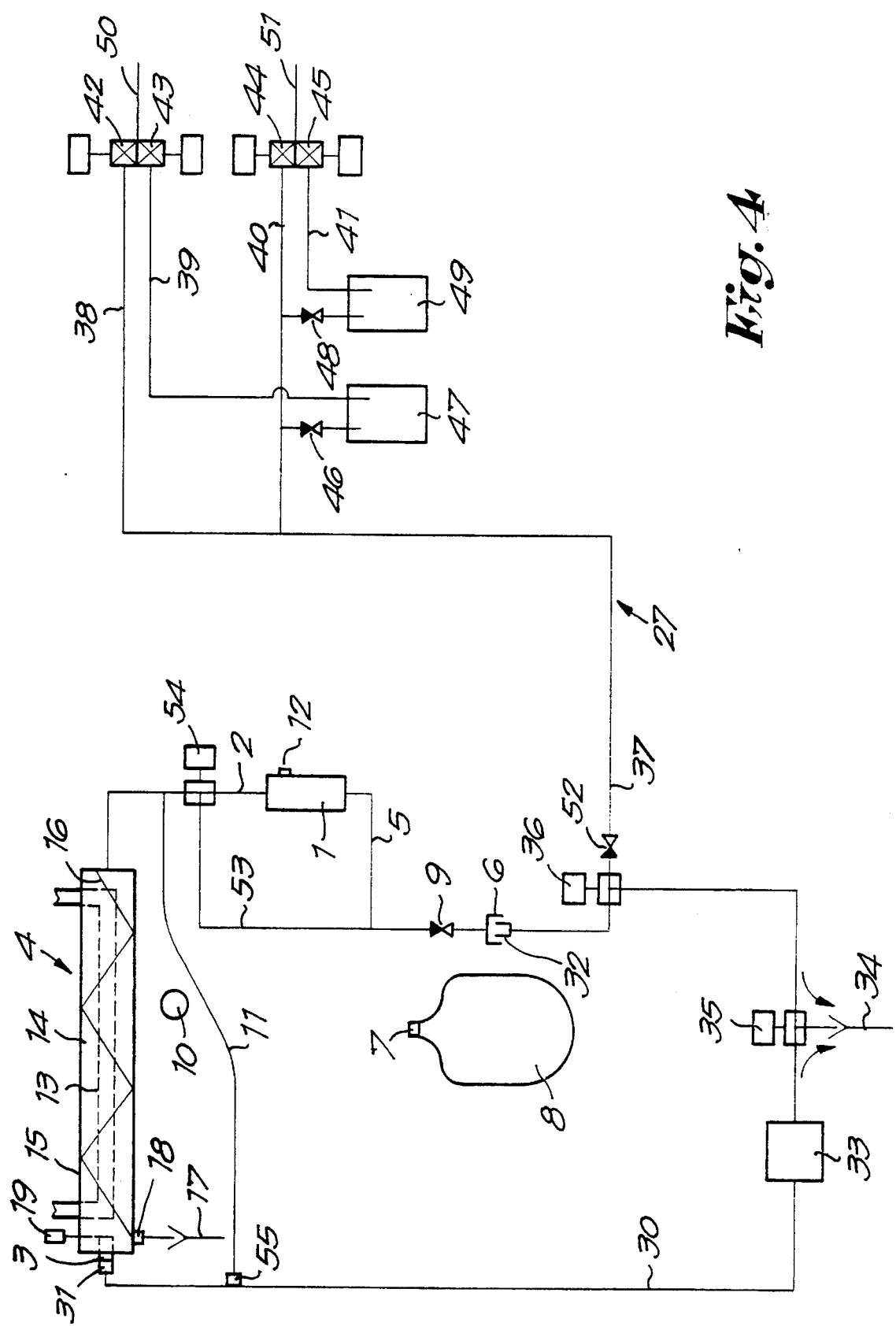
FIG. 4 is a schematic representation of the automatic device of the preceding figures, but during the draining of the cleaning, disinfecting or rinsing liquid.

The three-way valve 54 occupies the same position as when rinsing, but the three-way valve 45 blocks the drain conduit 34 whereas the three-way valve 36 connects the parts with the cleaning conduit 30 at both sides of the three-way valve 36 to each other. All the valves 42, 43, 44 and 45 are closed. The obtained situation is represented in FIG. 4.

By replacing the three-way valve 35, relative to the preceding situation, in the position where it connects the drain conduit 34 to the cleaning conduit 30, the closed circuit formed by the cleaning conduit 30, the pressure conduit 2 and the suction conduit 5 can be emptied or drained.

The succession of the three above mentioned operations can be chosen freely. It is possible first to rinse with warm water, then to drain, subsequently to rinse with cold water, drain again, rinse with cold water mixed with cleaning liquid, circulate this mixture etc.

It is important that with the first step the electromagnetic valve 29 is opened. This causes the heated gas of the compressor 21 not to be cooled in the condenser 22, but to be led straight to the evaporator, this is the part 13 of the cooling element 4. This part 13 thus no longer works as a cooling part but as a heating part, and the cooling element 4 will very quickly be heated above the freezing point. This avoids the liquid for rinsing or cleaning or the sanitary liquid from freezing in the chamber 14.

The above-described cleaning device 27 can easily be fitted on an existing automatic device according to such a device. It can also be fitted directly in new automatic devices. The cleaning device 27 is relatively simple in construction and allows an easy and especially very complete and effective cleaning. Liquid can be circulated without limitation. So far as it is necessary, certain parts such as the cooling element and the blending pump 1 can be taken apart for further cleaning but such a dismounting is limited to a minimum by the effectiveness of the cleaning. Because the cleaning is so easy and, apart from the connecting of the connection piece 31 to the draught end 3 and the connecting of the connection piece 32 to the connection piece 6 and the connecting of the conduit 11 to the connection piece 55, can be executed fully automatically by a programmable control unit, this cleaning will take place at the desired points in time, so that the bacteriological cleanness of the automatic device is assured.

The closeable opening of the pressure conduit to which the cleaning conduit is connected with a connection piece can be a disairing opening. This closeable opening can be the draught valve itself.

The automatic device need not to be a soft-ice automatic device. It can also be a milk-shake automatic device or a yoghurt automatic device or produce soft-ice as well as milk-shake.

I claim:

1. An automatic device for producing a cooled semi-liquid food product, such as soft-ice, milk-shake or yoghurt, from a starting composition comprising:

a first pump having an inlet and an outlet;

a reservoir housing the starting composition for the cooled semi-liquid food product;

a suction conduit having first and second ends, the first end of said suction conduit being connected to the inlet of said first pump, the second end of said suction conduit incorporating a first connection piece for selectively interconnecting said suction conduit with said reservoir;

a pressure conduit having a first end connected to the outlet of said pump and a second end defining a draught end for the cooled semi-liquid food product;

a cooling element arranged in said pressure conduit between the first and second ends thereof, said cooling element incorporating a cooling part that constitutes an evaporator of a cooling circuit;

a shunt conduit having a first end connected to said suction conduit between said first pump and said reservoir and a second end connected to said pressure conduit between said first pump and said cooling element; and a cleaning device including a cleaning conduit having first and second ends, the first end of said cleaning conduit being provided with a second connection piece and the second end of said cleaning conduit being provided with a third connection piece, said second connection piece being adapted to selectively interconnect the cleaning conduit to the second end of said pressure conduit and the third connection piece being adapted to selectively interconnect the cleaning conduit to said suction conduit, said cleaning device further including a drain conduit provided between the first and second ends of said cleaning conduit, a second pump, having a higher output capacity than said first pump, mounted along said cleaning conduit, means for selectively closing said drain conduit, liquid supply means incorporating a supply conduit adapted to receive a supply of cleaning liquid, means for fluidly interconnecting said supply conduit and said cleaning conduit, and means for blocking the supply of cleaning liquid to said cleaning conduit through said supply conduit, wherein said cleaning device is isolated from the remainder of said automatic device when the suction conduit is fluidly interconnected with the reservoir through the first connection piece such that said automatic device can be used to produce a cooled semi-liquid food product and, when said automatic device is to be cleaned, the cleaning conduit is fluidly interconnected with the suction conduit through the first and third connection pieces and the second end of said pressure conduit is fluidly interconnected with the cleaning conduit through the second connection piece so that cleaning liquid can be passed through the supply conduit, the cleaning conduit, the suction conduit, the shunt conduit, the pressure conduit and the drain conduit.

2. The automatic device according to claim 1, further including means for selectively closing said shunt conduit.

3. The automatic device according to claim 2, wherein said means for selectively closing said shunt conduit comprises a three-way valve arranged between said shunt conduit and one of said suction and pressure conduits.

4. The automatic device according to claim 1, wherein said means for selectively closing said drain conduit comprises a three-way valve mounted in both said drain conduit and said cleaning conduit.

5. The automatic device according to claim 1, wherein said means for fluidly interconnecting comprises a three-way valve interconnecting said supply conduit and said cleaning conduit.

6. The automatic device according to claim 1, wherein said second pump is arranged in said cleaning conduit between said second connection piece and said drain conduit.

7. The automatic device according to claim 1, further comprising means for connecting said supply conduit to a water distribution network.

8. The automatic device according to claim 7, wherein said means for blocking comprises at least one valve.

9. The automatic device according to claim 1, wherein said cleaning device further comprises a reservoir for a special cleaning liquid, said reservoir being mounted in a first section of said supply conduit that is parallel to a second section of said supply conduit, said blocking means comprising two valves, one of said two valves being arranged in said first section and the other of said two valves being arranged in said second section.

10. The automatic device according to claim 1, wherein the supply conduit is selectively connectable, through said blocking means, to a hot water supply, a cold water supply and first and second reservoirs for special cleaning liquids, said first reservoir being mounted in a first section of said supply conduit, said second reservoir being mounted in a second section of said supply conduit, said hot water supply being connected to a third section of said supply conduit and said cold water supply being connected to a fourth section of said supply conduit, said first and second sections of said supply conduit being arranged in parallel to said third and fourth sections respectively, said blocking means comprising four valves with each one of said four valves being arranged in a respective one of said first, second, third and fourth sections of said supply conduit.

11. The automatic device according to claim 1, wherein said second connection piece is a removable connection piece that is disconnected from the pressure conduit during use of the automatic device in producing a cooled semi-liquid food product.

12. The automatic device according to claim 1, further comprising a draught valve for selectively closing the draught end of said pressure conduit, said second connection piece fitting on the draught end of said pressure conduit.

* * * * *